June 12, 1934.  A. NOBLE  1,962,324
MEASURING APPARATUS
Filed July 15, 1932   2 Sheets-Sheet 2

INVENTOR
ALPHONSO NOBLE
BY
ATTORNEY

Patented June 12, 1934

1,962,324

UNITED STATES PATENT OFFICE 1,962,324

MEASURING APPARATUS

Alphonso Noble, Naugatuck, Conn., assignor to The Bristol Company, Waterbury, Conn., a corporation of Connecticut Application July 15, 1932, Serial No. 622,630

2 Claims. (Cl. 73—110)

The invention relates to measuring apparatus, and more especially to apparatus for measuring the effects, particularly the difference between the effects, of two variable conditions, for example, two varying fluid pressures.

It has for an object the provision of a measuring instrument which will afford direct indications of the difference between, or the algebraic sum of, the effects of two independently operating conditions or measuring systems, each of which is permitted to act freely upon mechanism for effecting movement of an indicating or recording element, or controlling member. The invention has for a further object the provision of a novel linkage arrangement between, or for combining the effects of, the said two measuring systems.

In carrying out the invention, two independently operating responsive or measuring systems are arranged to transmit forces or movements respectively to opposite ends of a lever, the fulcrum of which is arranged to float in that it is carried by an element which is movable about a fixed pivot. The said lever thus swings as a whole about this pivotal point, and the points of application of the two forces or motions from the respective measuring systems are so chosen that equivalent resulting movements effect no change in the position of the element, as when the two said systems are submitted simultaneously to equal changes; or, by suitably arranging the intermediate connections or responsive systems, the effects on the lever may be additive.

The nature of the invention, however, will best be understood when described in connection with the accompanying drawings, in which.

Figure 1:
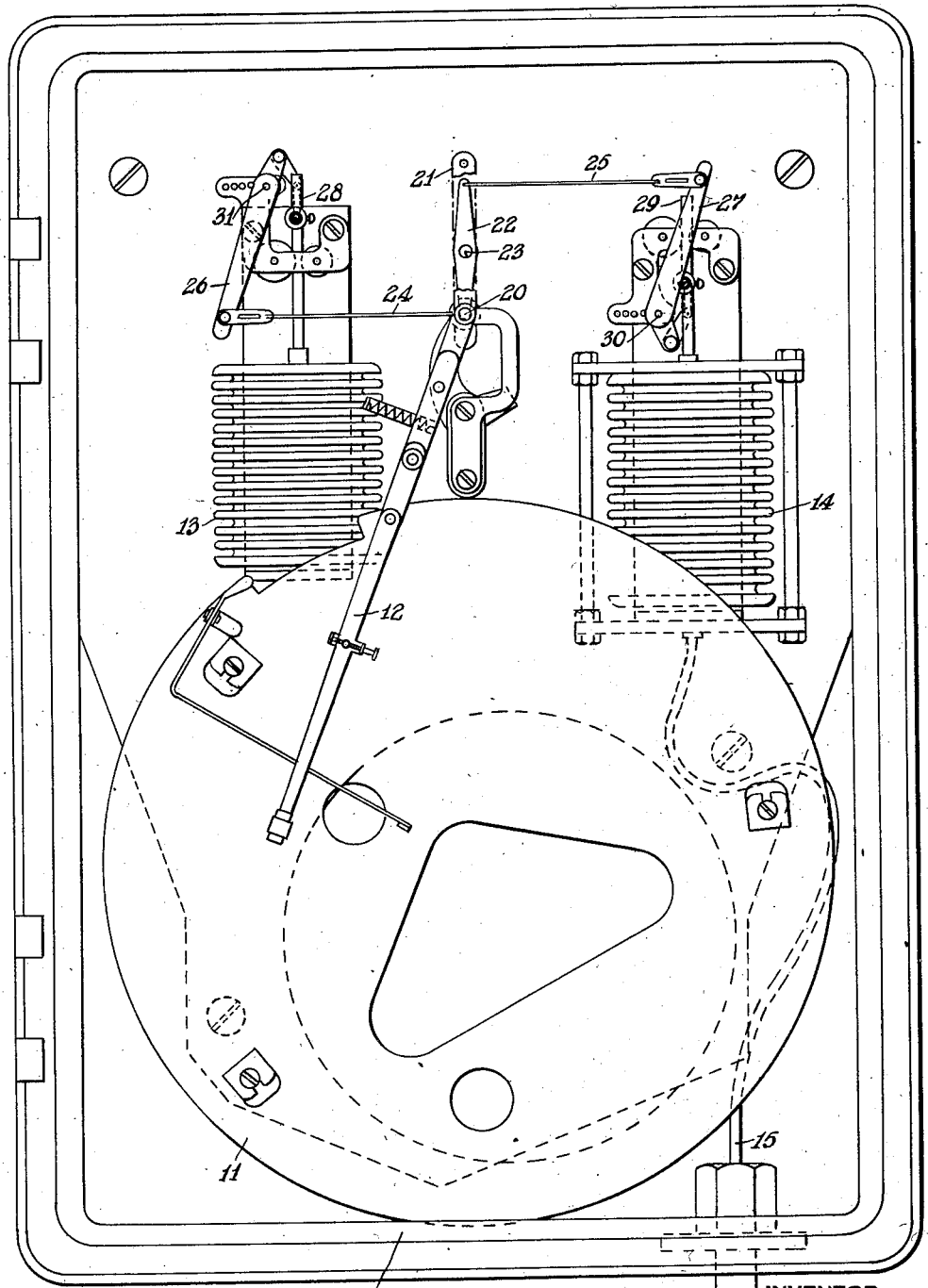
Fig. 1 is a front elevation of an instrument casing, with cover removed, and of the novel mechanism contained therein.
Figure 2:
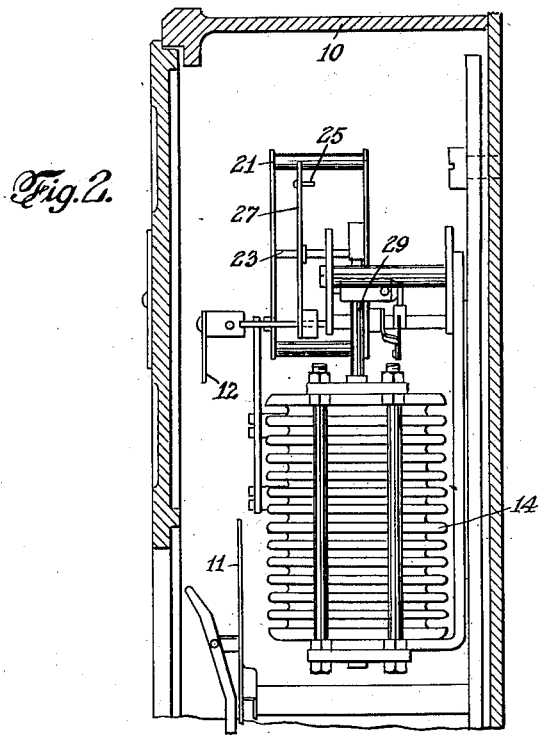
Fig. 2 is a fragmentary vertical section through the casing and an elevation of the contained mechanism.

Referring to the drawings, 10 designates a suitable instrument casing in which is mounted a chart support 11 and over which is adapted to move in well-known manner a controlling member or measuring element as the pen arm 12 adapted to be actuated in the manner hereinafter set forth from two independent measuring systems.

These systems may embody, for example, the two fluid pressure-actuated elements 13 and 14 mounted on the back of the casing, and which may be of any well known or special design. In the present embodiment, the element 13 represents a compensating element such as a barometric responsive element intended as a member adapted to compensate for the effect of barometric variations on the other element 14. The latter also is a fluid pressure-actuated element which is designed to measure some external pressure or temperature change and is, for this end, provided with a tubular outlet 15 to which external connection may be made in any well known manner.

The present invention is concerned more especially with the means for communicating the movement of the two pressure-actuated elements 13 and 14 to the measuring or controlling member 12 common thereto. The latter is shown in the form of a lever pivoted at 20 and having an arm 21 extending beyond said pivot. To this arm is fulcrumed a further lever 22 and preferably at the latter's middle point 23. Thus, the lever 22 is carried by the measuring member and any movement of said lever will be communicated thereto.

Movement of the lever 22 is derived from the two aforesaid pressure-actuated elements through intermediate mechanism including links 24 and 25 pivotally connected respectively to the opposite ends of the lever and preferably at equal distances from its fulcrum. The opposite ends of the links are connected respectively to the arms 26 and 27 of bell cranks whose opposite arms are linked to vertically movable rods 28 and 29 movable by the respective pressure-actuated elements.

Any movement of either of these elements will thus be communicated through the mechanism aforesaid to the lever 22, and when unequal will cause said lever to move as a whole about the pivot point 20, carrying with it the measuring member 12 which thus responds to the algebraic sum of the movements of the two pressure-actuated elements, or to any difference in their movement, this depending upon the mechanical arrangement for transmitting movement from the said pressure-actuated elements.

The mounting of the links 24 and 25 is such, moreover, that normally the longitudinal axis of the former link actuated from the element 13 passes, for example, through the fixed pivot 30 for the arm 27 of the opposite pressure-actuated element as well as through the pivot point 20 about which the pen arm 12 and its extension 21 swing.

Figure 3:
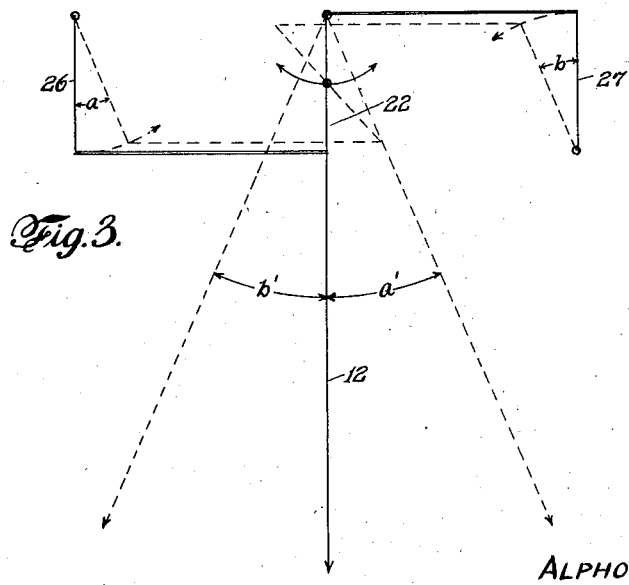
Fig. 3 is a kinematic diagram illustrating the action of the measuring apparatus.

Similarly, the longitudinal axis of the link 25 passes through a fixed pivot 31 for the arm 26 of the pressure-actuated element 13; and the point of attachment of the first-named link to the lever 22 is substantially at the pivot point 20 for the measuring arm. Several pivot points, as indicated, are provided for the respective arms in initially adjusting the same; and the effective action of these arms is really represented by a line normal to the links 24 and 25 to which they are attached, as indicated in Fig. 3 of the drawings. By this expedient, errors due to the angular movements are minimized, as with the structure set forth the links upon deflection depart from parallelism a minimum amount since the throw of a link is substantially parallel as being tangent to the arc described by the individual arms, or rather the effective normals representing these arms.

By the foregoing arrangement, reference being had more particularly to Fig. 3 of the drawings, it will be noted that an angular movement (a) of the arm 26 will cause an angular movement (a') of the member 12; and similarly an angular movement (b) of the arm 27 will cause an angular movement (b') thereof. If these movements are equal, the angular movements (a) and (b) upon opposite sides of the lever 22 will have a net effect upon the measuring member 12 which carries the same to the initial or zero position; and, correspondingly, unequal movement of the aforesaid arms will result in a differential effect upon the said member 12.

Furthermore, by changing the location of the point of attachment of a link 24 or 25 to the lever 22, or by changing the effective length of an arm 26 or 27, the effects of equal angular movements may, of course, be made to cause unequal effects upon member 12.

I claim:

1. An instrument, comprising two independent responsive systems, an arm actuated by one of the systems and movable about a fixed pivot, an arm actuated by the other of the systems and movable about a fixed pivot, a member movable about a fixed pivot, a lever carried by the movable member which affords a floating fulcrum therefor, a pair of links connecting the respective arms with opposite ends of the said lever, the longitudinal axis of one of the links normally passing through the pivot point of the arm actuated by the opposite responsive system, and the longitudinal axis of the other link normally passing through the pivot point of the other arm.

2. An instrument, comprising two independent responsive systems, an arm actuated by one of the systems and movable about a fixed pivot, an arm actuated by the other of the systems and movable about a fixed pivot, a member movable about a fixed pivot, a lever carried by the movable member which affords a floating fulcrum therefor, a pair of links connecting the respective arms with opposite ends of the said lever, the longitudinal axis of one of the links normally passing through the pivot point of the arm actuated by the opposite responsive system, and the longitudinal axis of the other link normally passing through the pivot point of the other arm and the point of attachment of one of the links to the lever being normally at the pivot point of the movable member.

ALPHONSO NOBLE.